United States Patent
Lubben et al.

(10) Patent No.: US 12,227,161 B2
(45) Date of Patent: Feb. 18, 2025

(54) BRAKE PEDAL FEEDBACK SYSTEM

(71) Applicant: DEERE & COMPANY, Moline, IL (US)

(72) Inventors: Jeffrey L. Lubben, Hudson, IA (US); Pradip Shinde, Pune (IN); Lowell D. Stutzman, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 247 days.

(21) Appl. No.: 18/067,810

(22) Filed: Dec. 19, 2022

(65) Prior Publication Data

US 2023/0264665 A1 Aug. 24, 2023

Related U.S. Application Data

(60) Provisional application No. 63/334,723, filed on Apr. 26, 2022, provisional application No. 63/259,909, filed on Feb. 24, 2022.

(51) Int. Cl.
| | |
|---|---|
| *B60T 8/40* | (2006.01) |
| *B60T 7/04* | (2006.01) |
| *G05G 1/34* | (2008.04) |
| *G05G 5/05* | (2006.01) |

(52) U.S. Cl.
CPC .............. *B60T 8/4086* (2013.01); *B60T 7/04* (2013.01); *G05G 1/34* (2013.01); *G05G 5/05* (2013.01)

(58) Field of Classification Search
CPC .................................... G05G 1/34; B60T 7/04
See application file for complete search history.

(56) References Cited

U.S. PATENT DOCUMENTS

| | | | | |
|---|---|---|---|---|
| 2,065,459 A | * | 12/1936 | Jenkins | B60T 11/04 188/106 P |
| 4,205,734 A | * | 6/1980 | Ostrowski | B60T 11/24 60/581 |

(Continued)

FOREIGN PATENT DOCUMENTS

| | | |
|---|---|---|
| CA | 2128301 A1 | 3/1995 |
| CN | 104760580 A | 7/2015 |

(Continued)

OTHER PUBLICATIONS

German Search Report issued in application No. DE102023100988.5, dated Jan. 19, 2024, 14 pages.

(Continued)

*Primary Examiner* — Daniel D Yabut

(57) ABSTRACT

A brake pedal feedback system includes a spring driver, a first spring, a first brake pedal, and a second brake pedal. The spring driver includes a first recess and a second recess. The first brake pedal includes a first extension at least partially positioned in the first recess. The second first brake pedal includes a second extension at least partially positioned in the second recess. When the first brake pedal is in an engaged position and the second brake pedal is in a disengaged position, the first extension contacts a first surface of the first recess causing the spring driver to move the first spring from a relaxed condition to an energy storing condition, and the second extension is spaced apart from a first surface of the second recess.

20 Claims, 15 Drawing Sheets

(56) References Cited

U.S. PATENT DOCUMENTS

| | | | |
|---|---|---|---|
| 4,441,596 A * | 4/1984 | Nakahara | B60W 30/18063 192/12 C |
| 6,323,641 B1 | 11/2001 | Allwine | |
| 6,433,536 B1 | 8/2002 | Yundt et al. | |
| 6,655,756 B2 | 12/2003 | Riddiford et al. | |
| 6,997,281 B2 | 2/2006 | Chernoff et al. | |
| 7,517,026 B1 | 4/2009 | Herbst et al. | |
| 7,539,571 B2 | 5/2009 | Strosser et al. | |
| 7,857,400 B2 | 12/2010 | Weiberle et al. | |
| 8,827,048 B2 | 9/2014 | Mazzucchi et al. | |
| 9,205,818 B2 | 12/2015 | Széll et al. | |
| 9,260,088 B2 | 2/2016 | Shand et al. | |
| 9,447,832 B2 | 9/2016 | Bishop et al. | |
| 9,605,724 B2 | 3/2017 | Okuma | |
| 10,112,587 B2 | 10/2018 | Richards et al. | |
| 10,576,887 B2 | 3/2020 | Wolf-Monheim | |
| 10,899,330 B2 | 1/2021 | Schmitz et al. | |
| 11,215,252 B2 | 1/2022 | Ruiz et al. | |
| 2004/0251095 A1 | 12/2004 | Simard et al. | |
| 2007/0209471 A1 * | 9/2007 | Nunez | G05G 1/01 74/566 |
| 2007/0284160 A1 | 12/2007 | Loring et al. | |
| 2008/0091319 A1 | 4/2008 | Schick et al. | |
| 2009/0001805 A1 | 1/2009 | Schick et al. | |
| 2010/0201191 A1 | 8/2010 | Schick et al. | |
| 2013/0233118 A1 | 9/2013 | Khan et al. | |
| 2014/0176130 A1 | 6/2014 | Bueno Palacios | |
| 2017/0122779 A1 | 5/2017 | Krishna et al. | |
| 2020/0001711 A1 * | 1/2020 | Burke | G05G 5/05 |
| 2020/0001838 A1 | 1/2020 | Hurd et al. | |
| 2021/0078579 A1 | 3/2021 | Negri et al. | |
| 2021/0094519 A1 | 4/2021 | Patoglu | |

FOREIGN PATENT DOCUMENTS

| | | | |
|---|---|---|---|
| CN | 108528422 A | | 9/2018 |
| DE | 1246428 B | | 8/1967 |
| DE | 19902128 A1 | | 11/1999 |
| DE | 19958241 A1 | | 8/2001 |
| DE | 10012179 A1 | | 10/2001 |
| DE | 10052442 A1 | | 5/2002 |
| DE | 10232212 A1 | | 1/2004 |
| DE | 102020105675 A1 | | 10/2020 |
| EP | 1409962 A2 | | 4/2004 |
| EP | 3220105 A1 | | 9/2017 |
| EP | 3614107 A1 | | 2/2020 |
| JP | 2003-226165 A | | 8/2003 |
| JP | 2004268748 A | * | 9/2004 |
| JP | 2013141833 A | * | 7/2013 |
| JP | 2016-215754 A | | 12/2016 |
| WO | WO 0242713 A2 | | 5/2002 |

OTHER PUBLICATIONS

German Search Report issued in application No. 102023100942.7, dated Sep. 14, 2023, 6 pages.

* cited by examiner

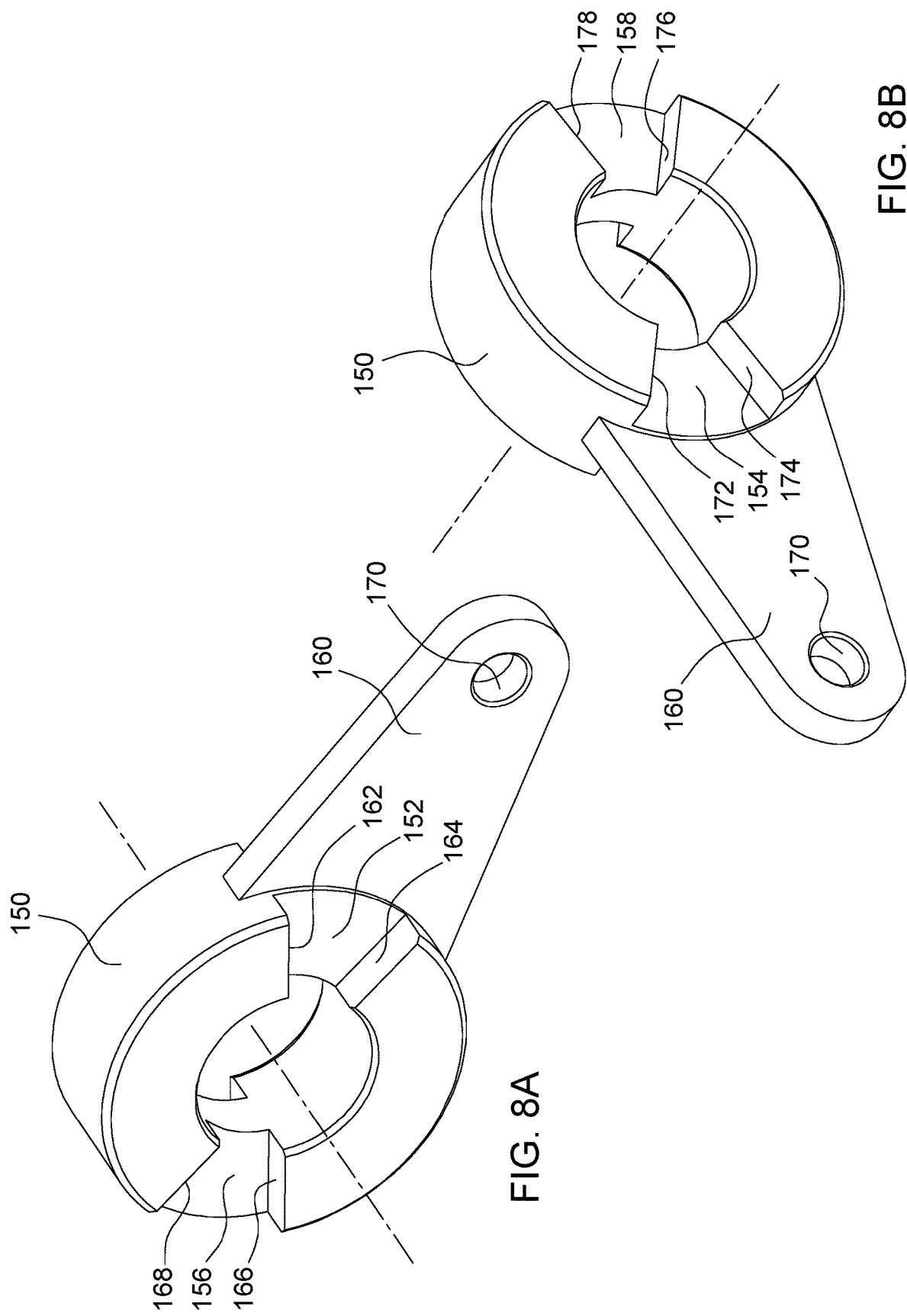

BRAKE PEDAL FEEDBACK SYSTEM

CROSS-REFERENCE TO RELATED APPLICATIONS

This application claims the benefit of U.S. Provisional Application No. 63/259,909, filed Feb. 24, 2022, and U.S. Provisional Application No. 63/334,723, filed Apr. 26, 2022, which are hereby incorporated by reference.

FIELD OF THE DISCLOSURE

The present disclosure relates to brake pedal feedback system for a work vehicle.

BACKGROUND

Work vehicles include a braking system activated by one or more brake pedals. Work vehicles can include a brake-by-wire system activated by one or more brake pedals without the mechanical link between the brake pedals and the braking system. Work vehicles can include separate brake pedals to operate the left and right brakes.

SUMMARY

According to an aspect of the present disclosure, a brake pedal feedback system includes a spring driver having a first recess and a second recess, a first spring connected to the spring driver, a first brake pedal having a first extension at least partially positioned in the first recess, and a second brake pedal having a second extension at least partially positioned in the second recess.

According to an aspect of the present disclosure, when the first brake pedal is in a disengaged position and the second brake pedal is in a disengaged position, the first extension is positioned near a first surface of the first recess, the second extension is positioned near a first surface of the second recess, and the first spring is in a relaxed condition.

According to an aspect of the present disclosure, when the first brake pedal is in an engaged position and the second brake pedal is in the disengaged position, the first extension contacts the first surface of the first recess causing the spring driver to move the first spring from the relaxed condition to an energy storing condition, and the second extension is spaced apart from the first surface of the second recess.

According to an aspect of the present disclosure, when the first brake pedal is in the disengaged position and the second brake pedal is in an engaged position, the first extension is spaced apart from the first surface of the first recess, and the second extension contacts the first surface of the second recess causing the spring driver to move the first spring from the relaxed condition to the energy storing condition.

According to an aspect of the present disclosure, when the first brake pedal is in the engaged position and the second brake pedal is in the engaged position, the first extension contacts the first surface of the first recess and the second extension contacts the first surface of the second recess causing the spring driver to move the first spring from the relaxed condition to the energy storing condition.

According to an aspect of the present disclosure, when the first brake pedal is in the engaged position and the second brake pedal is in the disengaged position, the first spring exerts a force to return the first brake pedal to the disengaged position.

According to an aspect of the present disclosure, when the first brake pedal is in the disengaged position and the second brake pedal is in the engaged position, the first spring exerts a force to return the second brake pedal to the disengaged position.

According to an aspect of the present disclosure, when the first and second brake pedals are in the engaged positions, the first spring exerts a force to return the first and second brake pedals to the disengaged positions.

According to an aspect of the present disclosure, a first return spring biases the first brake pedal to the disengaged position.

According to an aspect of the present disclosure, the spring driver is connected to a push rod configured to compress the first spring when at least one of the first and second brake pedals are in the engaged position.

According to an aspect of the present disclosure, a first spring receiver is connected to an extension of the spring driver and a first push rod. A second spring receiver is connected to a second push rod. The first spring is positioned between the first spring receiver and the second spring receiver. A second spring is positioned between the second spring receiver and the second push rod. The first push rod compresses at least one of the first and second springs when at least one of the first and second brake pedals are in the engaged position.

According to an aspect of the present disclosure, the spring driver includes a ball ramp configured to compress the first spring when at least one of the first and second brake pedals are in the engaged position.

According to an aspect of the present disclosure, a ball ramp includes a rotating ramp and a sliding ramp. A support disc is spaced apart from the sliding ramp. The first spring is positioned between the sliding ramp and the support disc. The sliding ramp compresses the first spring when at least one of the first and second brake pedals are in the engaged position.

According to an aspect of the present disclosure, a ball ramp includes a rotating ramp and a sliding. A housing is spaced apart from the sliding ramp. The first spring is positioned between the sliding ramp and the housing. The sliding ramp compresses the first spring when at least one of the first and second brake pedals are in the engaged position.

According to an aspect of the present disclosure, a work vehicle can include any implementation of the brake pedal feedback system disclosed herein.

The above and other features will become apparent from the following detailed description and accompanying drawings.

BRIEF DESCRIPTION OF THE DRAWINGS

The detailed description of the drawings refers to the accompanying figures in which:

FIG. 8A is a left perspective view of a spring driver, according to an implementation;

FIG. 8B is a right perspective view of a spring driver, according to an implementation;

Like reference numerals are used to indicate like elements throughout the several figures.

DETAILED DESCRIPTION

The implementations disclosed in the above drawings and the following detailed description are not intended to be exhaustive or to limit the present disclosure to these implementations.

Figure 1:
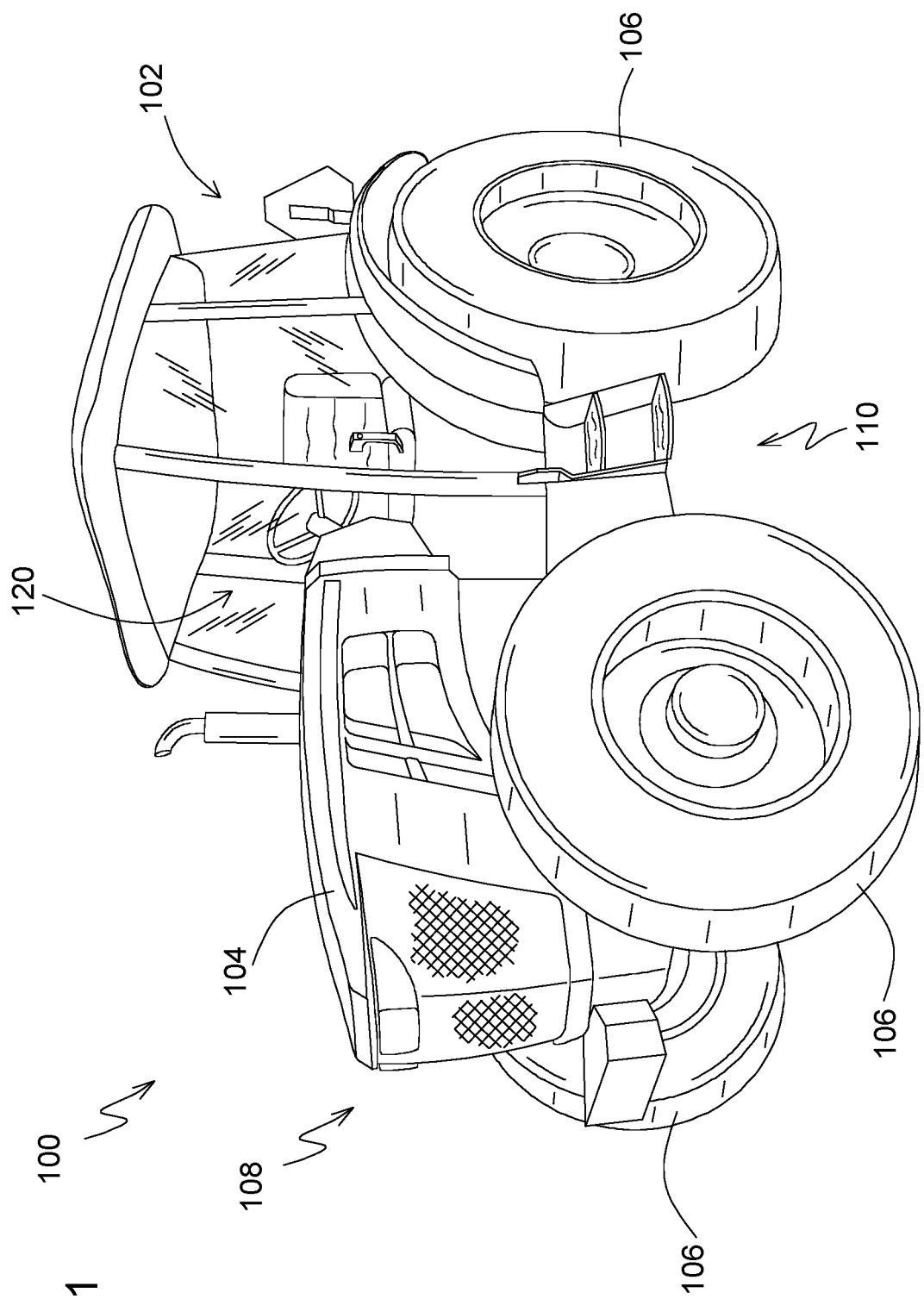
FIG. 1 is a perspective view of a work vehicle including a brake pedal feedback system, according to an implementation.
Figure 2:
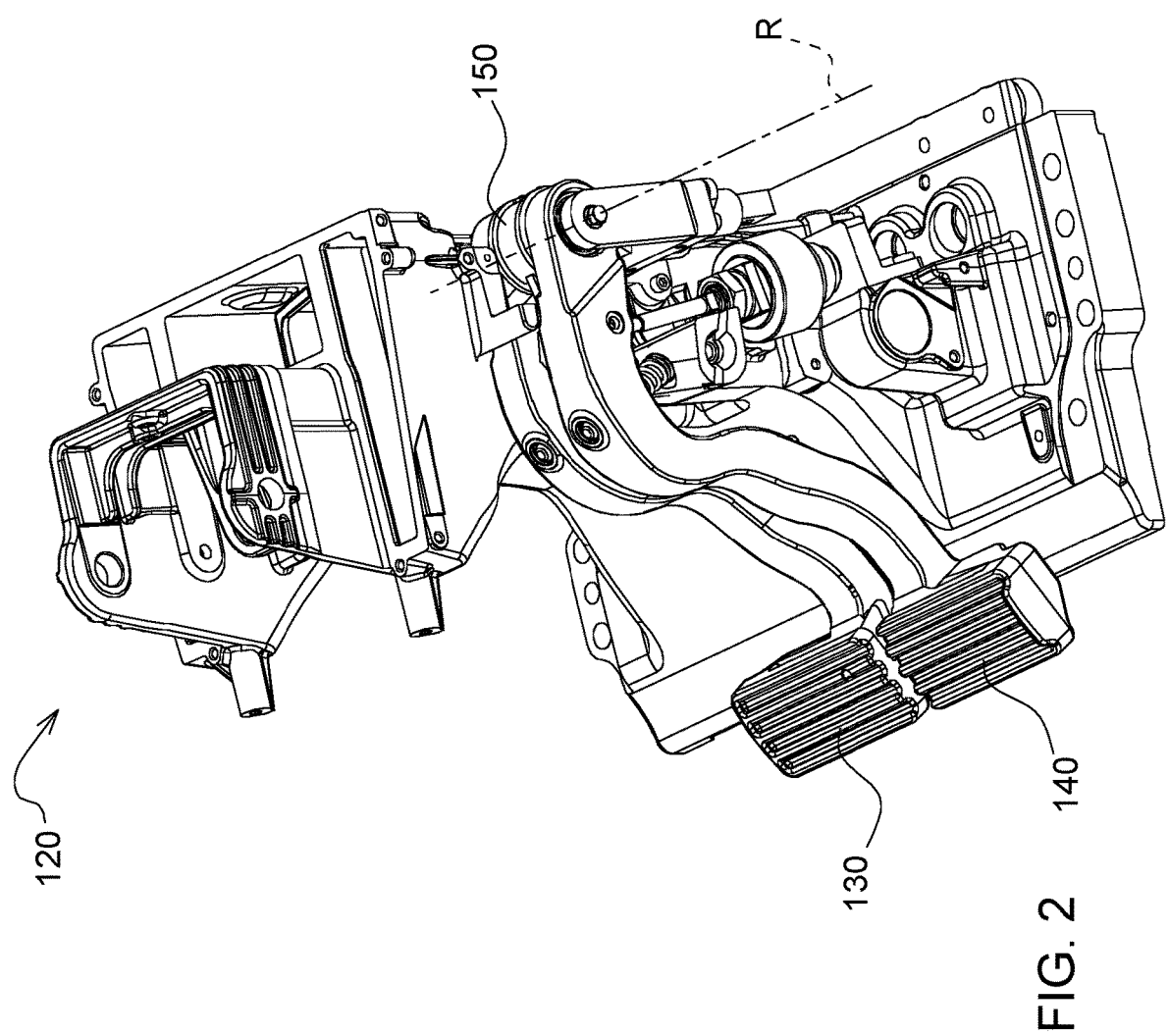
FIG. 2 is a right perspective view of a brake pedal feedback system, according to an implementation.
Figure 3:
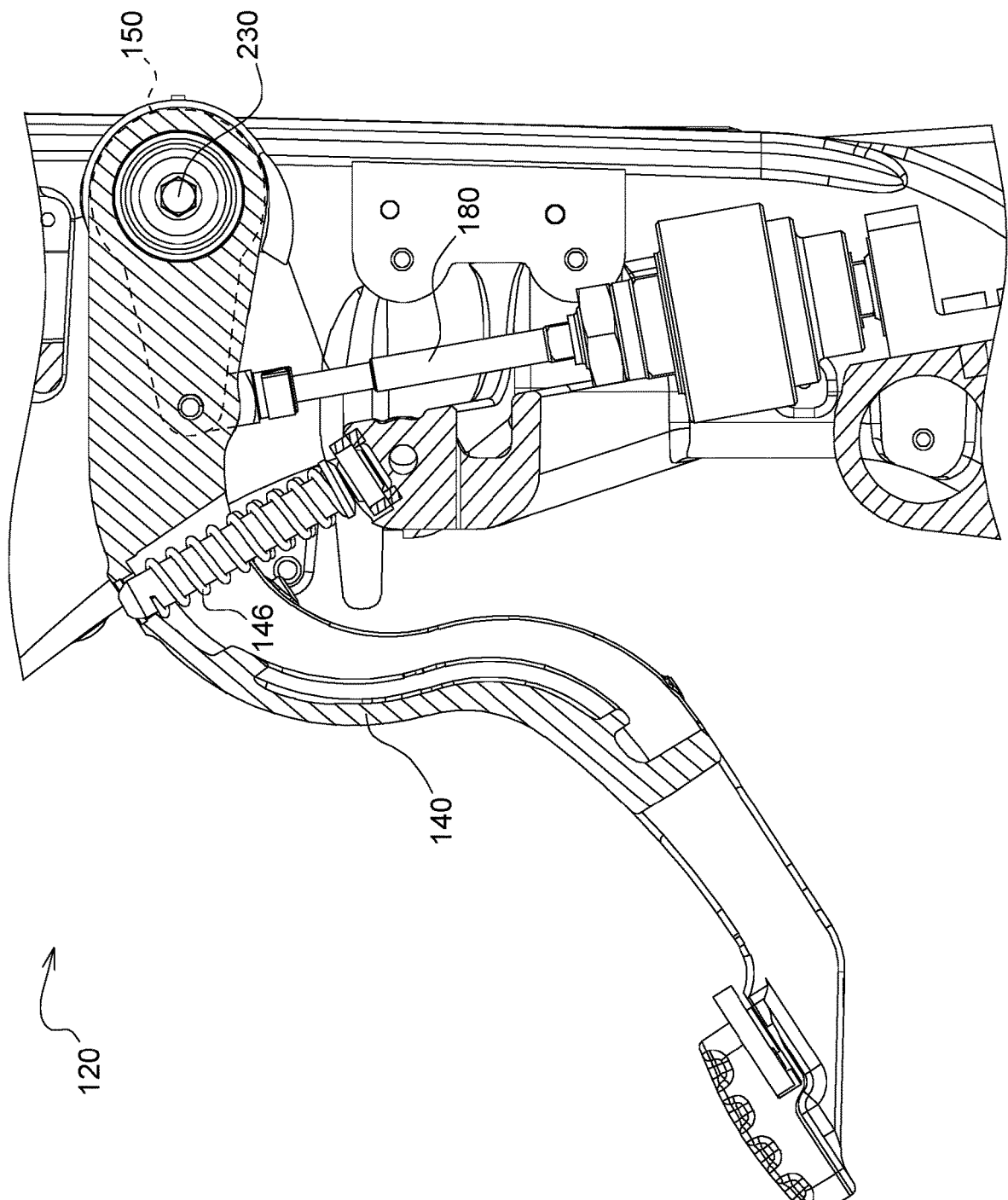
FIG. 3 is a right sectional view of a brake pedal feedback system, according to an implementation.
Figure 4:
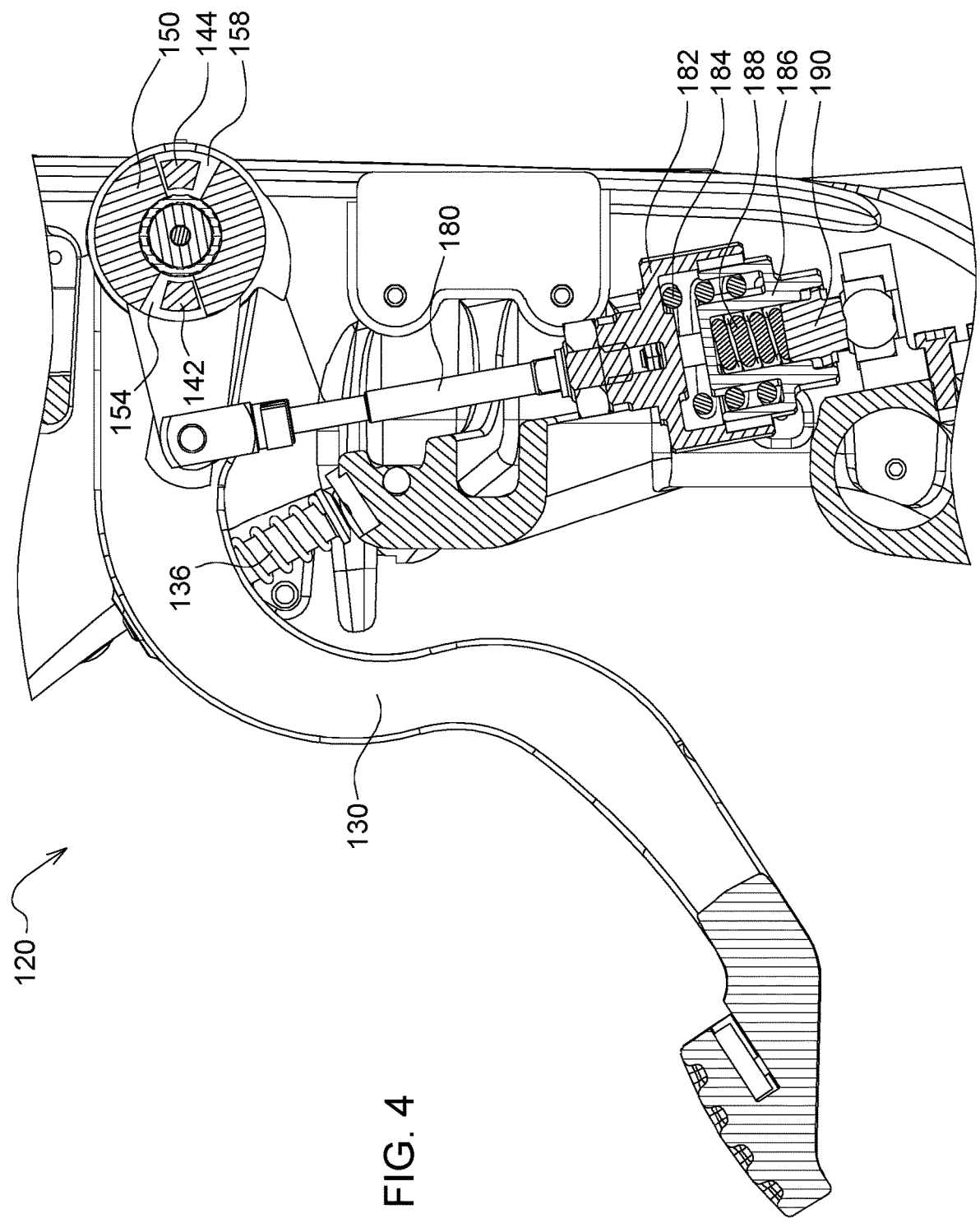
FIG. 4 is a right sectional view of a brake pedal feedback system, according to an implementation.
Figure 5:
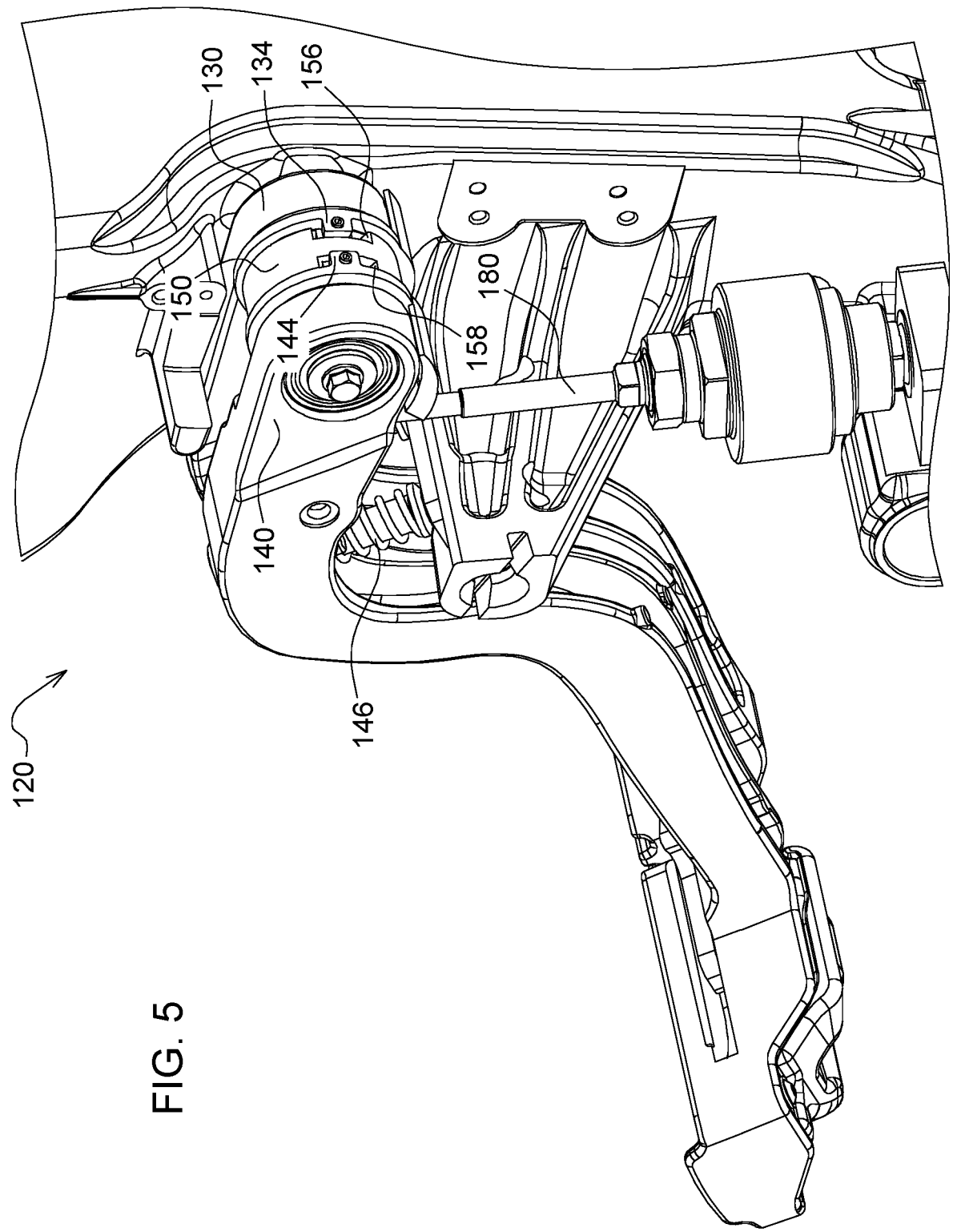
FIG. 5 is a rear perspective view of a brake pedal feedback system, according to an implementation.
Figure 6:
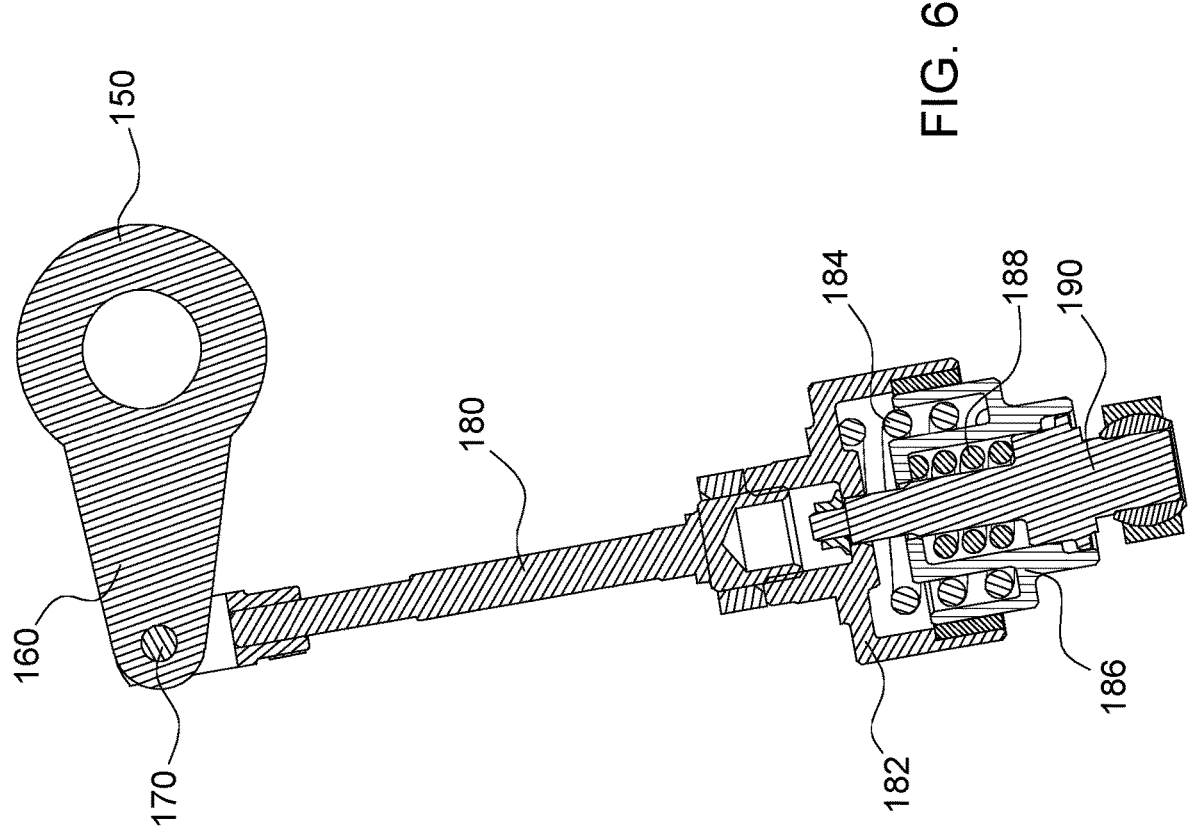
FIG. 6 is a right sectional view of a brake pedal feedback system, according to an implementation.
Figure 7:
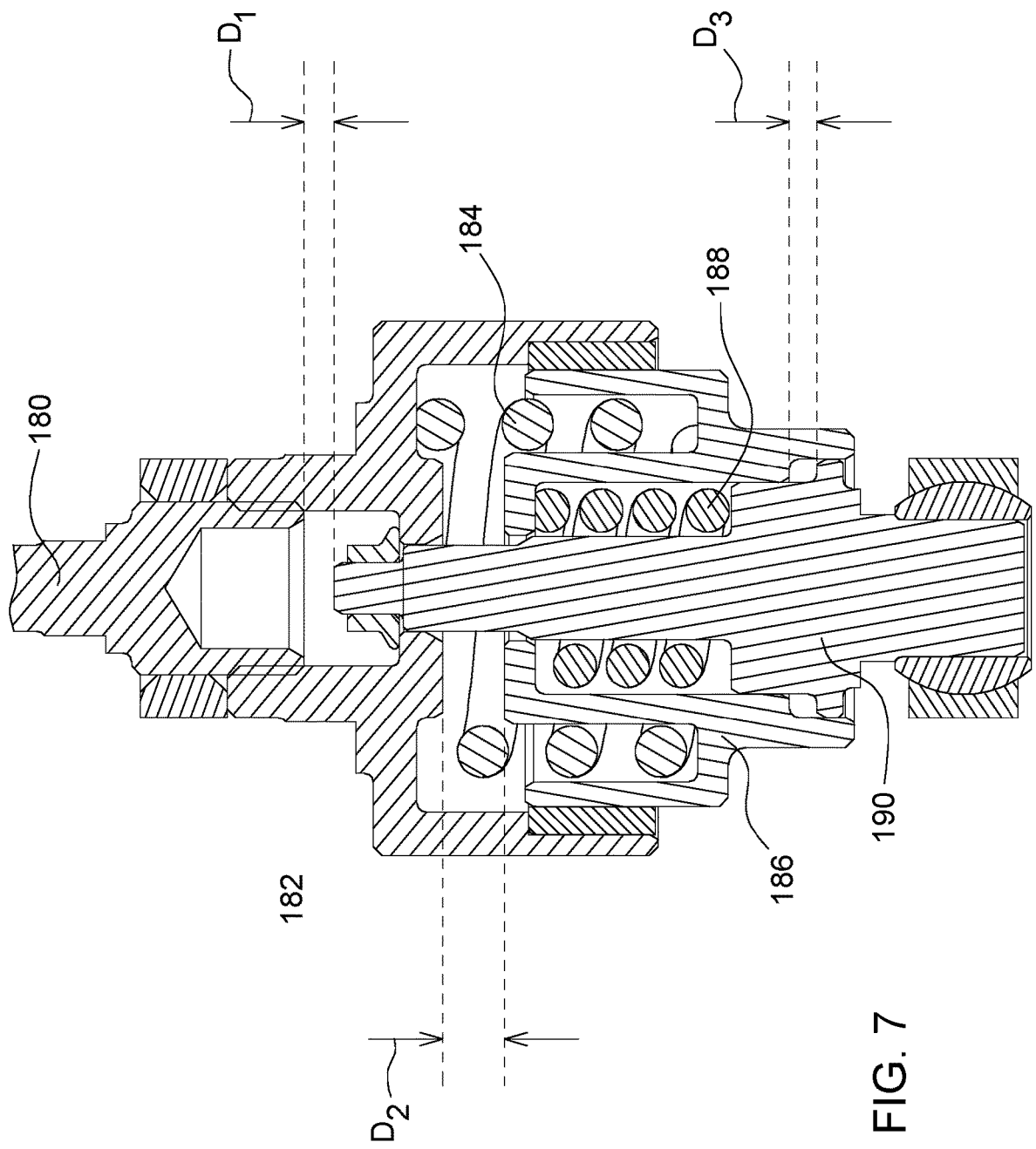
FIG. 7 is a right sectional view of a brake pedal feedback system, according to an implementation.

FIG. 1 illustrates a work vehicle 100, for example an agricultural tractor. This disclosure also applies to other types of work vehicles in agriculture, construction, forestry, and road building. The work vehicle 100 can include an operator station or cab 102, a hood 104, one or more ground engaging apparatus 106, for example wheels or track assemblies, and a frame or chassis 110. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a brake pedal feedback system 120.

With reference to all the FIGURES, a brake pedal feedback system 120 can be utilized with a left brake pedal 130 and a right brake pedal 140 in a brake-by-wire system. The left and right brake pedals 130, 140 include a disengaged position and an engaged position, which can include a plurality of partially engaged positions and a fully engaged position. A left return spring 136 biases the left brake pedal 130 in a disengaged position. The left return spring 136 can return and maintain the left brake pedal 130 in a disengaged position when the left brake pedal 130 is not being operated or utilized. A right return spring 146 biases the right brake pedal 140 in a disengaged position. A right return spring 146 can return and maintain the right brake pedal 140 in a disengaged position when the right brake pedal 140 is not being operated or utilized.

The brake pedal feedback system 120 can include a spring driver 150 interacting with the left and right brake pedals 130, 140. The spring driver 150 and the left and right brake pedals 130, 140 can all rotate around an axis of rotation R. The spring driver 150 functions in a comparable manner and provides a similar or the same force feedback whether the left brake pedal 130 is in an engaged position, the right brake pedal 140 is in an engaged position, or both brake pedals 130, 140 are in engaged positions. The brake pedal feedback system 120 can include one or more bearings 202, seals, fasteners or other components as shown in FIGURES. The brake pedal feedback system 120 can include one or springs 184, 188, 222, 224. The spring driver 150 can interact with one or springs 184, 188, 222, 224.

The spring driver 150 is positioned between the left and right brake pedals 130, 140. The spring driver 150 can include a slot or recess 152 on the left side and a second slot or recess 154 on the right side. Alternatively, the spring driver 150 can include a two slots or recesses 154, 158 on the right side and two slots or recesses 152, 156 on the left side, as shown in FIGS. 8A and 8B. The recess 152 includes a first surface 162 and a second surface 164. The recess 156 includes a first surface 166 and a second surface 168. The recess 154 includes a first surface 172 and a second surface 174. The recess 158 includes a first surface 176 and a second surface 178.

The left brake pedal 130 can include a dog or extension 132 positioned at least partially within the recess 152. Alternatively, the left brake pedal 130 can include a dog or extension 132 positioned at least partially within the recess 152 and a dog or extension 134 positioned at least partially within the recess 156, as shown in FIGS. 9A and 9C. The right brake pedal 140 can include a dog or extension 142 positioned at least partially within the recess 154. Alternatively, the right brake pedal 140 can include a dog or extension 142 positioned at least partially within the recess 154 and a dog or extension 144 positioned at least partially within the recess 158, as shown in FIGS. 9B and 9D.

Figure 9B:
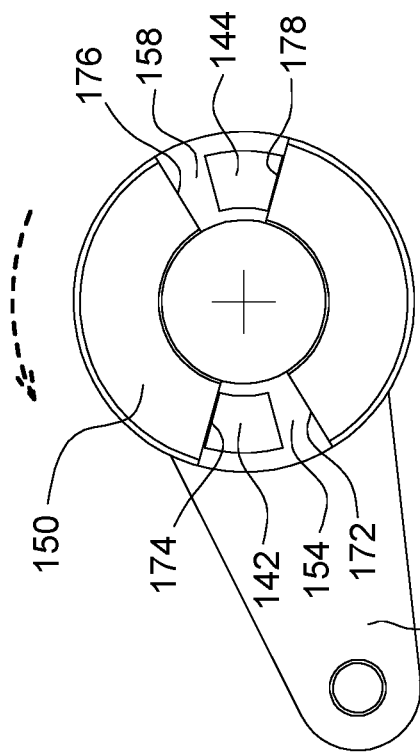
FIG. 9B is a right perspective view of a spring driver, according to an implementation.
Figure 9D:
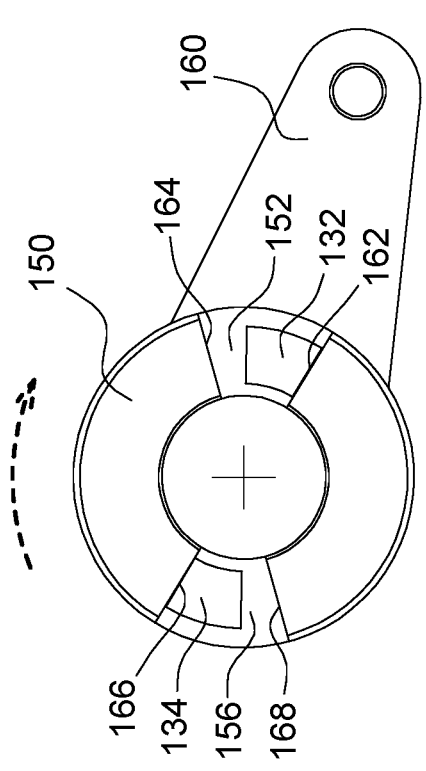
FIG. 9D is a right perspective view of a spring driver, according to an implementation.
Figure 9A:
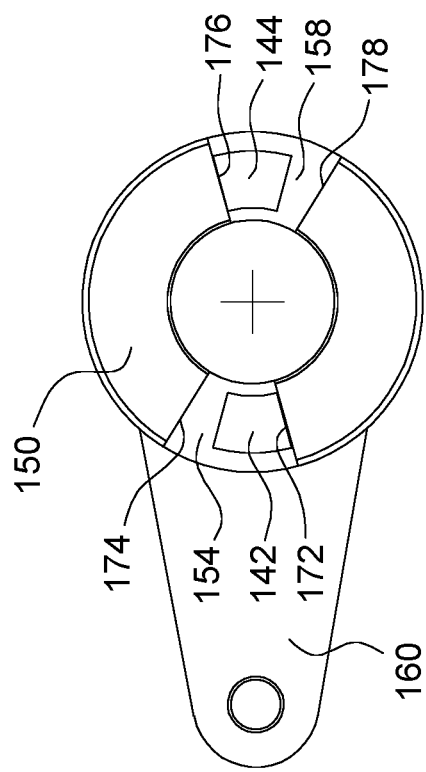
FIG. 9A is a left perspective view of a spring driver, according to an implementation.
Figure 9C:
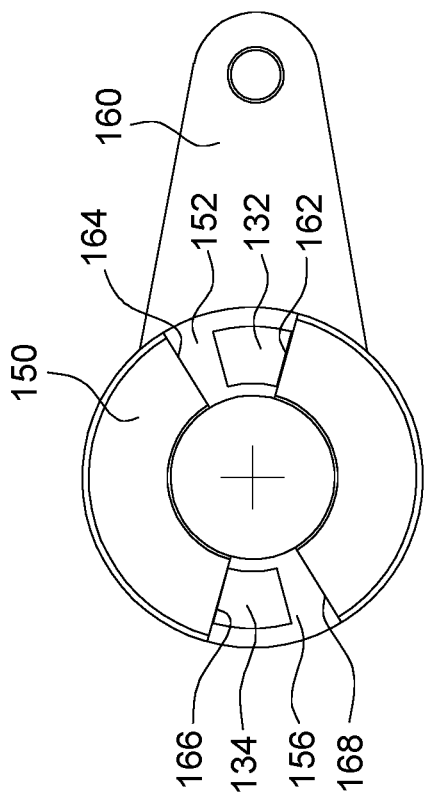
FIG. 9C is a left perspective view of a spring driver, according to an implementation.
Figure 10:
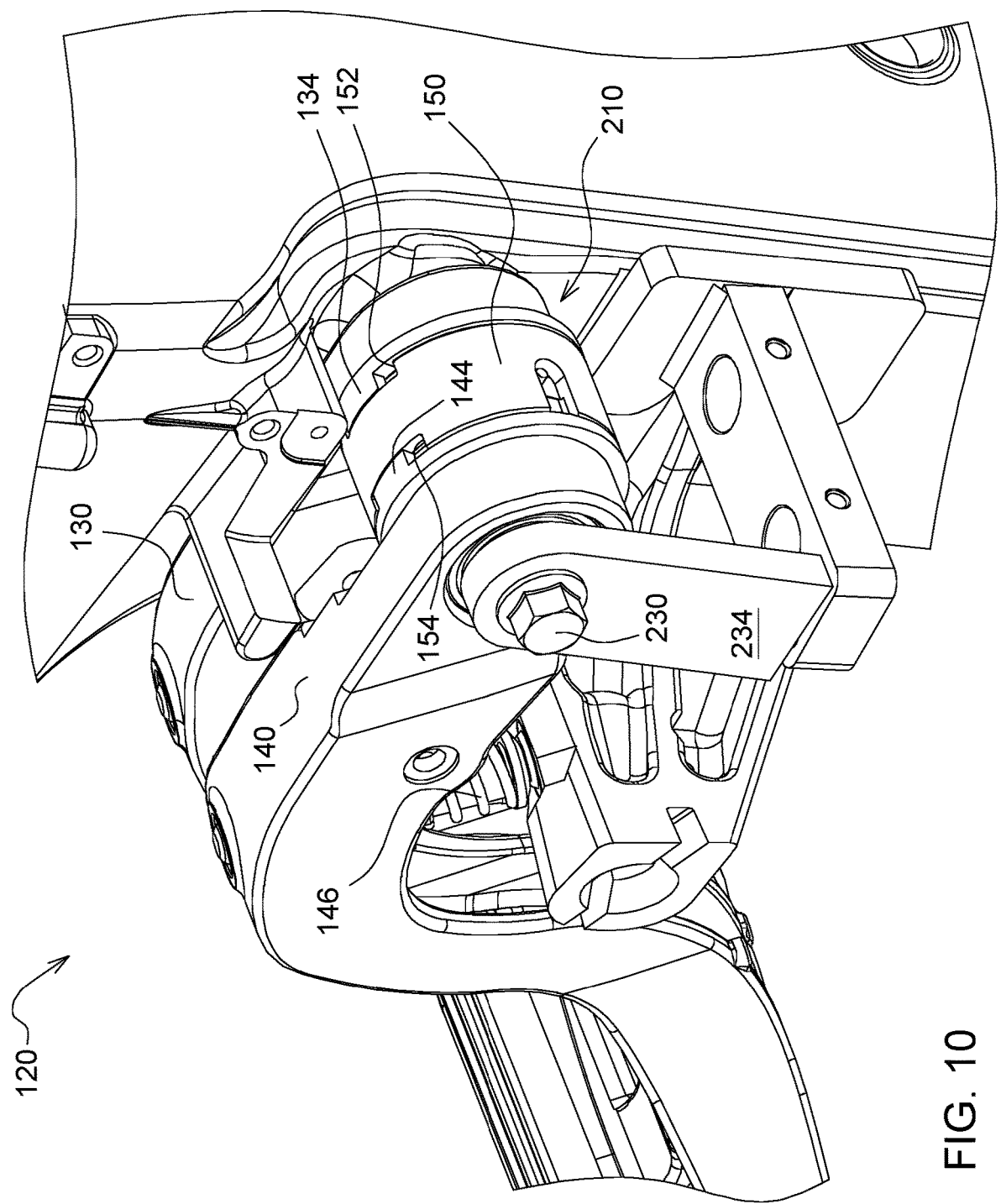
FIG. 10 is a rear perspective view of a brake pedal feedback system, according to an implementation.
Figure 11:
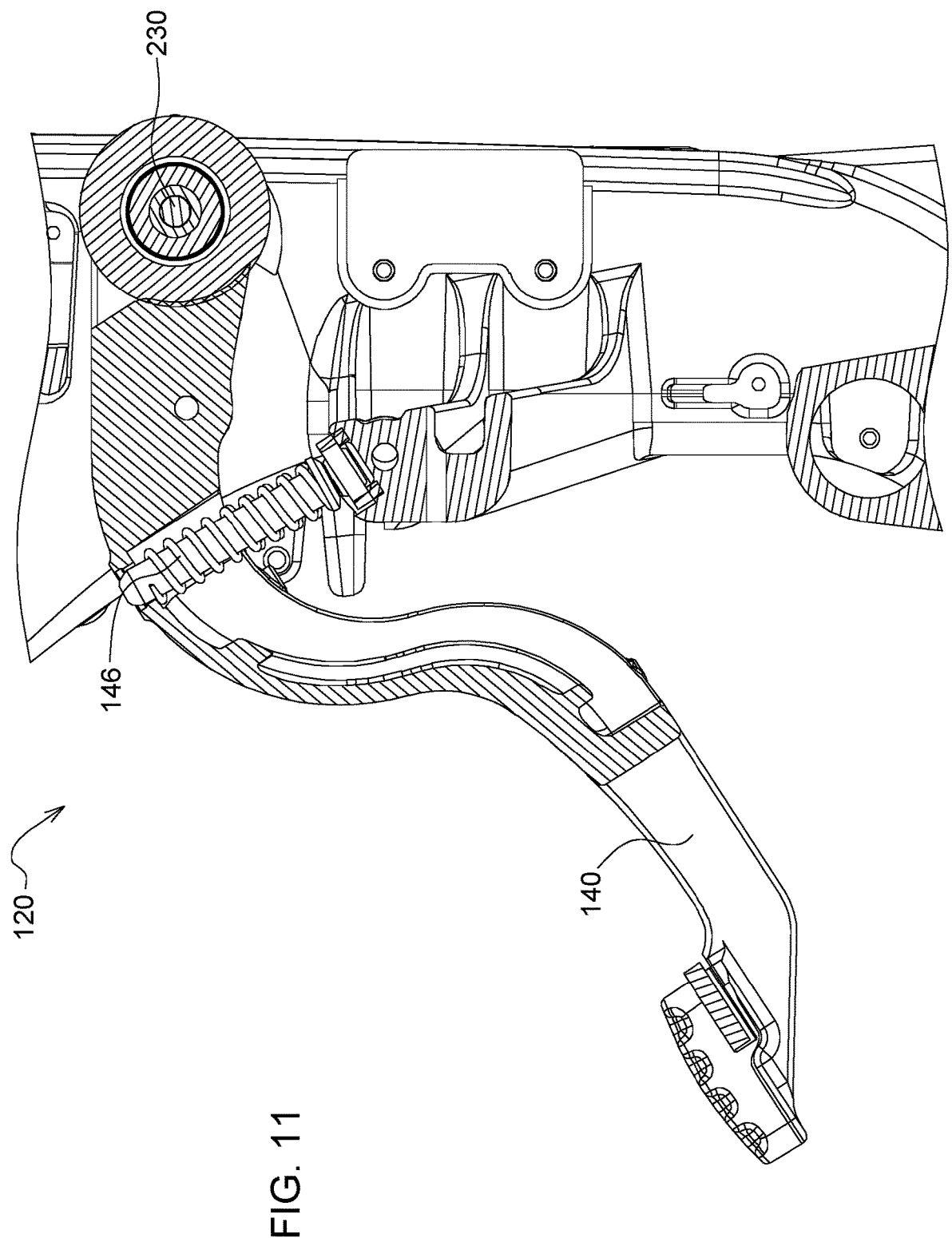
FIG. 11 is a right sectional view of a brake pedal feedback system, according to an implementation.
Figure 12:
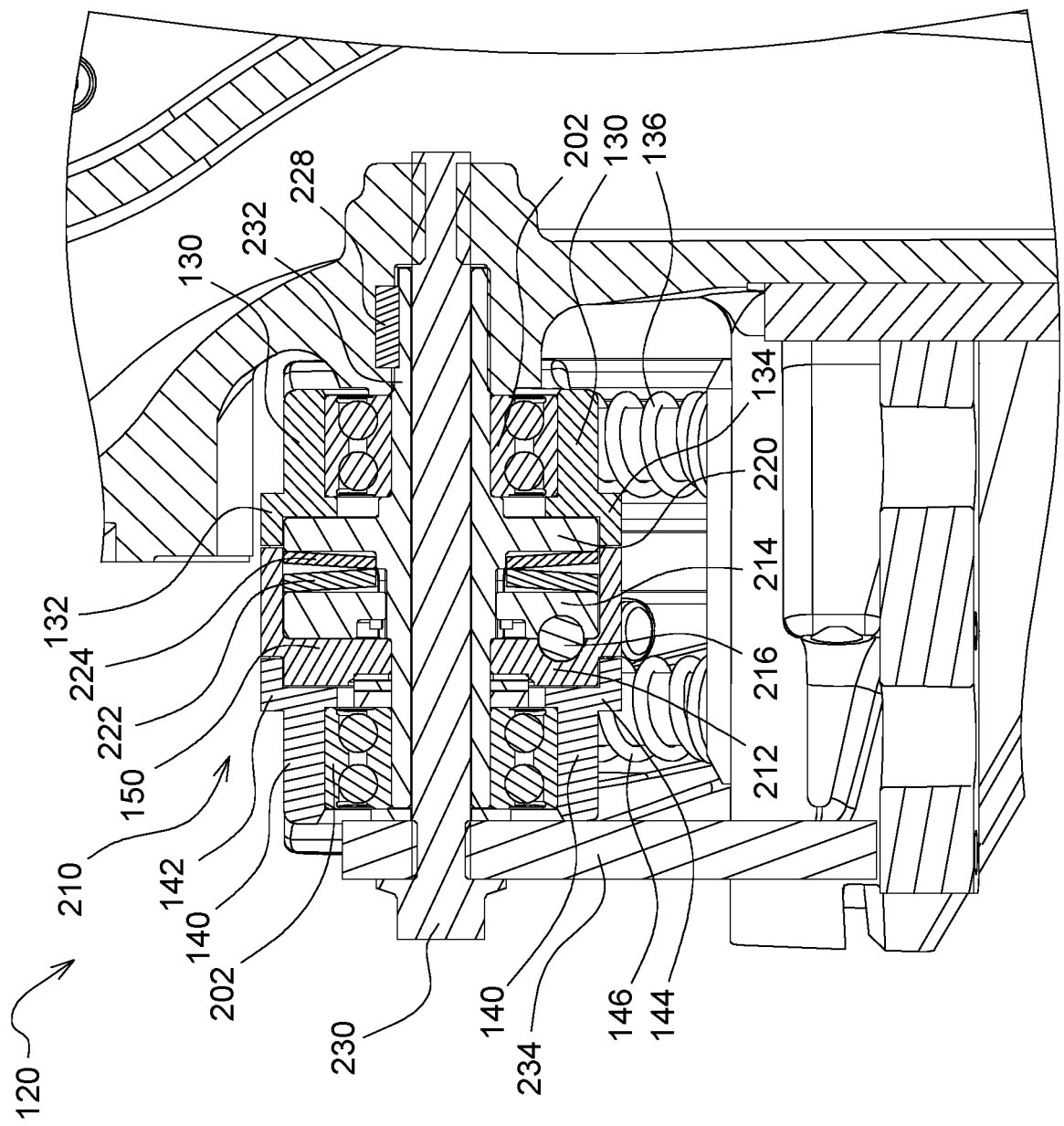
FIG. 12 is a rear sectional view of a brake pedal feedback system, according to an implementation.
Figure 13:
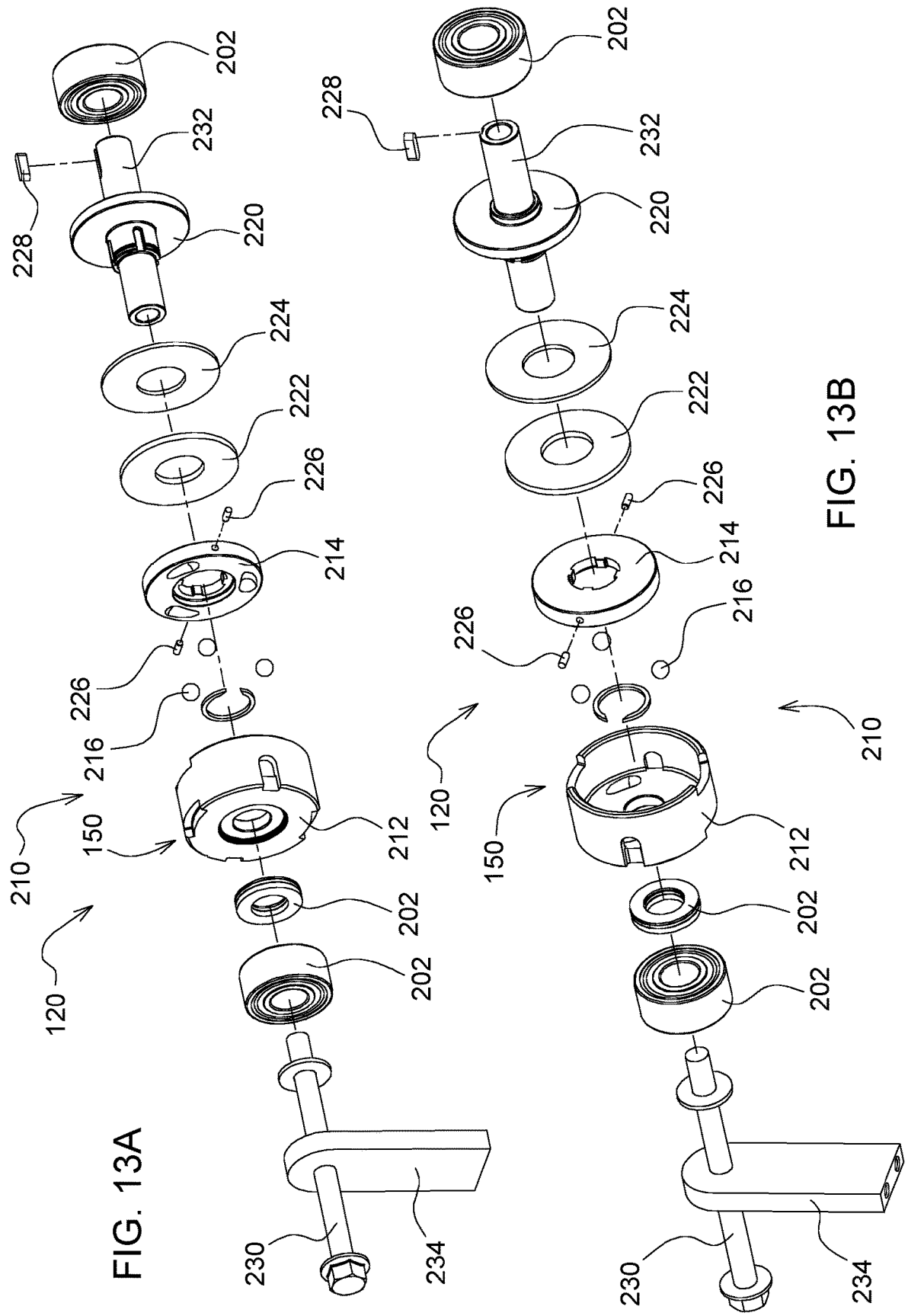
FIG. 13A is an exploded view of a brake pedal feedback system, according to an implementation.
FIG. 13B is an exploded view of a brake pedal feedback system, according to an implementation.

When both the left and right brake pedals 130, 140 are in a disengaged position, the extensions 132, 134, 142, 144 are positioned closer to one end of the recesses 152, 154, 156, 158 than the other end, as shown in FIGS. 9A and 9B. The extension 132 is positioned near a first surface 162 of the recess 152. The extension 134 is positioned near a first surface 166 of the recess 156. The extension 142 is positioned near a first surface 172 of the recess 154. The extension 144 is positioned near a first surface 176 of the recess 158.

When the left brake pedal 130 is pressed downward in one of the engaged positions, the left brake pedal 130 rotates about the axis of rotation R. The extension 132 contacts the first surface 162 of the recess 152 and the extension 134 contacts the first surface 166 of the recess 156, which causes the spring driver 150 to rotate with the left brake pedal 130, as shown in FIG. 9C. The right brake pedal 140 remains in the disengaged position and the extensions 142, 144 remain stationary with the right brake pedal 140, as shown in FIG. 9D. The extensions 142, 144 of the right brake pedal 140 are spaced apart or separated from the first ends 172, 176 of the recesses 154, 158. When the left brake pedal 130 is in one of the engaged positions, or in the fully engaged position, and the right brake pedal 140 is in the disengaged position, the extensions 142, 144 of the right brake pedal 140 can be positioned near the second ends 174, 178 of the recesses 154, 158.

When the right brake pedal 140 is pressed downward in one of the engaged positions, the right brake pedal 140 rotates about the axis of rotation R. The extension 142 contacts the first surface 172 of the recess 154 and the extension 144 contacts the first surface 176 of the recess 158, which causes the spring driver 150 to rotate with the right brake pedal 140. The left brake pedal 130 remains in the disengaged position and the extensions 132, 134 remain stationary with the left brake pedal 130. The extensions 132, 134 of the left brake pedal 130 are spaced apart or separated from the first ends 162, 166 of the recesses 152, 156. When the right brake pedal 140 is in one of the engaged positions, or in the fully engaged position, and the left brake pedal 130 is in the disengaged position, the extensions 132, 134 of the left brake pedal 130 can be positioned near the second ends 164, 168 of the recesses 152, 156.

According to some implementations, the spring driver 150 can include an arm or extension 160 pivotally or rotatably connected to a push rod 180 at connection 170, as show in FIGS. 2-7. When the spring driver 150 rotates based upon one or more of the brake pedals 130, 140 being pressed downward in one of the engaged positions, the push rod 180 moves based in part on the length of the extension 160. The push rod 180 can interact with one or more springs 184, 188. The push rod 180 is connected to a spring receiver 182 contacting a first end of a spring 184. A spring receiver 186 contacts a second end of the spring 184 and a first end of a spring 188. A push rod 190 connects to the frame or chassis 110 and contacts a second end of the spring 188. The spring receiver 182 moves with the push rod 180 to compress the spring 184 between the spring receiver 182 and the spring receiver 186 from a relaxed condition to an energy storing condition. When compressed, the spring 184 exerts a force to return the spring driver 150 and the one or more engaged brake pedal 130, 140 to the disengaged position. The force of the spring 184 against the spring receiver 186 compresses spring 188 between the spring receiver 186 and the push rod 190 from a relaxed condition to an energy storing condition. When compressed, the spring 188 exerts a force to return the spring driver 150 and the one or more engaged brake pedal 130, 140 to the disengaged position.

The stiffness or spring constant of the spring 184 can be the same as, greater than, or less than the stiffness or spring constant of the spring 188. The spring constants of the springs 184, 188 can be selected to provide the desired feedback as at least one of the brake pedals 130, 140 is pressed downward in one of the engaged positions. The springs 184, 188 can have a constant or variable stiffness. The springs 184, 188 can be helical springs. A distance $D_1$ determines the total travel of the pushrod 180. The spring 184 can be compressed a distance $D_2$ until the spring receiver 182 contacts the spring receiver 186. The spring 188 can be compressed a distance $D_3$ until the spring receiver 186 contacts the pushrod 190. The distance $D_1$ can be the same as, greater than, or less than the combined distance $D_2$ and distance $D_3$. As one or both brake pedals 130, 140 are pressed downward in one of the engaged positions, the compression of the springs 184, 188 depends upon the relative stiffness of the springs 184, 188 and the relative dimensions of distances $D_1$, $D_2$ and $D_3$. The springs 184, 188 could compress individually in any order or simultaneously. When the one or more engaged brake pedals 130, 140 are released, one or more of the springs 184, 188 move the spring receivers 182, 186, the push rod 180, and the spring driver 150 back to the disengaged position. The left and right return springs 136, 146 maintain the left and right brake pedals 130, 140 in the disengaged position.

According to some implementations, the spring driver 150 can include a ball ramp 210 having a rotating ramp 212, a sliding ramp 214, and a plurality of balls 216, as shown in FIGS. 10-13B. The ball ramp 210 can be positioned between the left and right brake pedals 130, 140. A shaft 232 includes a support disc 220 spaced apart from the sliding ramp 214. The sliding ramp 214 is connected to the shaft 232 to prevent rotation of the sliding ramp 214 relative to the shaft 232. The sliding ramp 214 can move axially along the shaft 232. The sliding ramp 214 can include one or more pins 226. The shaft 232 can include a key 228. When the spring driver 150 rotates based upon one or more of the brake pedals 130, 140 being pressed downward in one of the engaged positions, the rotating ramp 212 rotates relative to the sliding ramp 214 causing the sliding ramp 214 to move towards the support disc 220. The sliding ramp 214 compresses one or more springs 222, 224 between the sliding ramp 214 and the support disc 220, which compresses one or more of the springs 222, 224 from a relaxed condition to an energy storing condition. When compressed, one or more of the springs 222, 224 exert a force to return the spring driver 150 and the one or more engaged brake pedal 130, 140 to the disengaged position. When the one or more engaged brake pedals 130, 140 are released, the springs 222, 224 move the sliding ramp 214 back towards the rotating ramp 212 and the spring driver 150 back to the disengaged position. The left and right return springs 136, 146 maintain the left and right brake pedals 130, 140 in the disengaged position.

Figure 14:
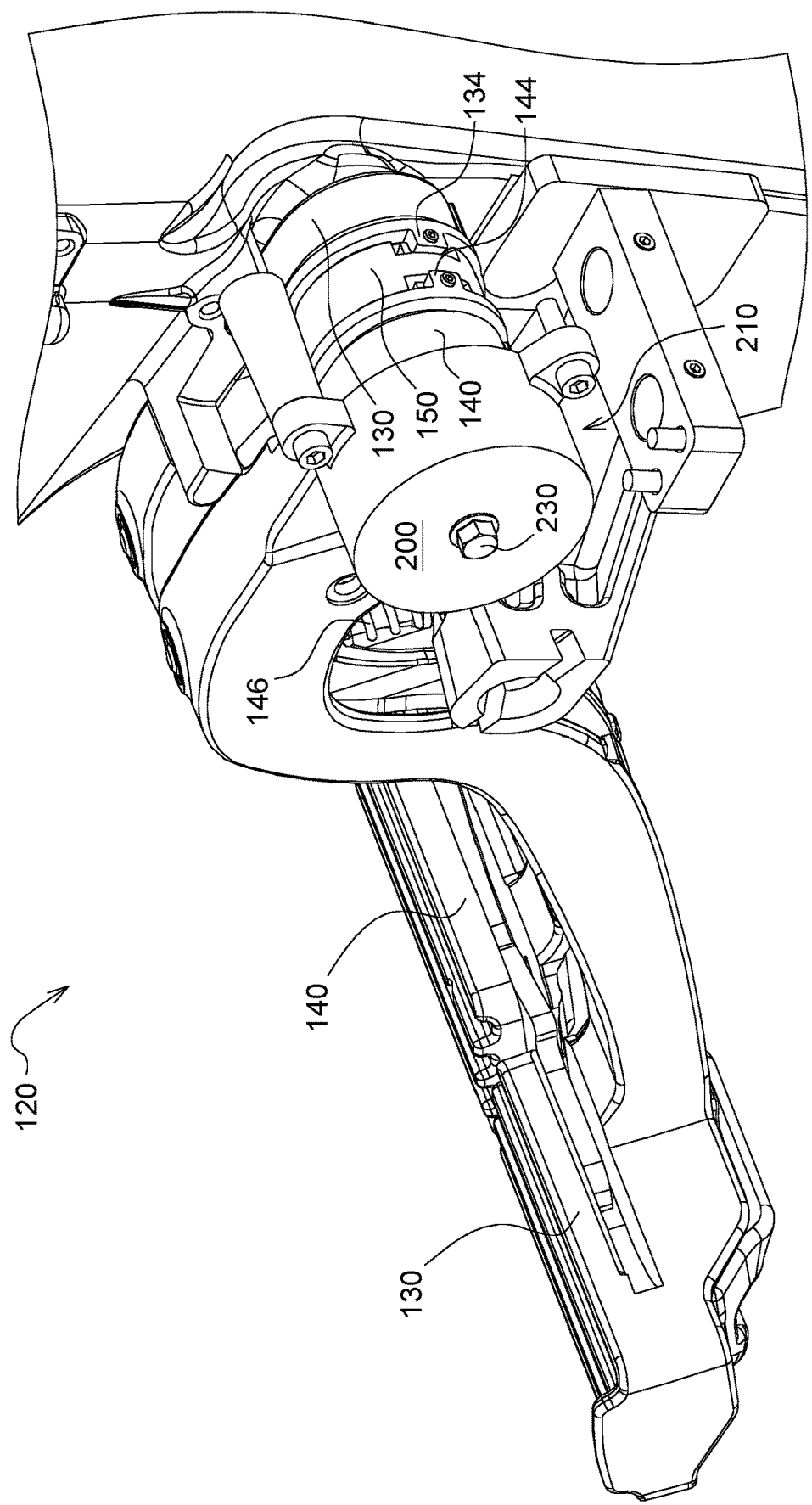
FIG. 14 is a rear perspective view of a portion of a brake pedal feedback system, according to an implementation.
Figure 15:
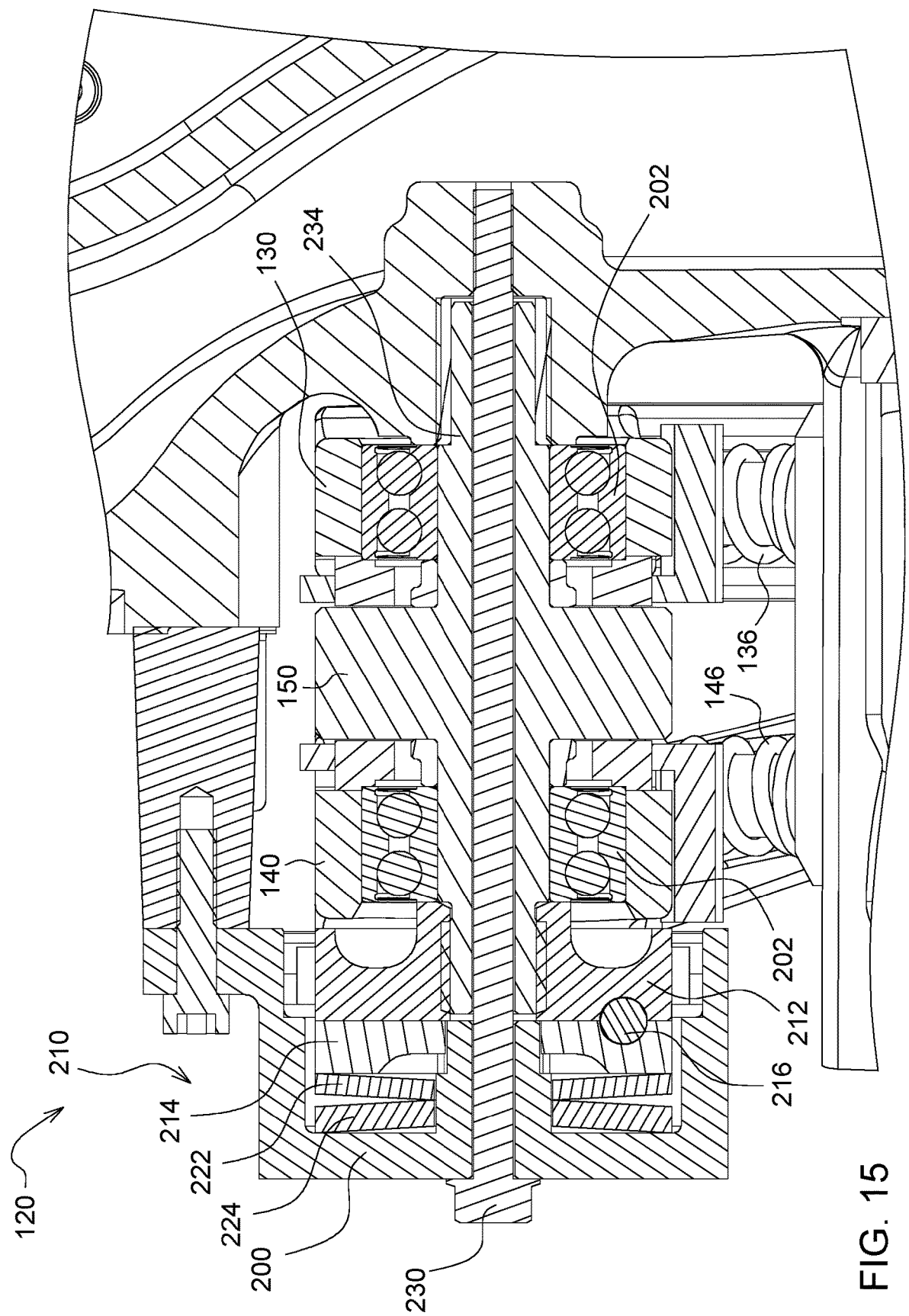
FIG. 15 is a rear sectional view of a portion of a brake pedal feedback system, according to an implementation.

According to some implementations, the spring driver 150 connects to a ball ramp 210 including a rotating ramp 212, a sliding ramp 214, and a plurality of balls 216, as shown in FIGS. 14-15. The ball ramp 210 can be positioned on the right side of the right brake pedal 140 or on the left side of the left brake pedal 130. A cover or housing 200 can at least partially surround or enclose the ball ramp 210. The housing 200 can be fixed to the frame or chassis 110. The sliding ramp 214 is connected to the housing 200 to prevent rotation of the sliding ramp 214 relative to the housing 200. The sliding ramp 214 can move axially within with housing 200. The spring driver 150 can include a shaft 234, which connects to the rotating ramp 212. When the spring driver 150 rotates based upon one or more of the brake pedals 130, 140 being pressed downward in one of the engaged positions, the rotating ramp 212 rotates relative to the sliding ramp 214 causing the sliding ramp 214 to move towards the housing 200. The sliding ramp 214 compresses one or more springs 222, 224 between the sliding ramp 214 and the housing 200, which compresses one or more of the springs 222, 224 from a relaxed condition to an energy storing condition. When compressed, one or more of the springs 222, 224 exert a force to return the spring driver 150 and the one or more engaged brake pedal 130, 140 to the disengaged position. When the one or more engaged brake pedals 130, 140 are released, the springs 222, 224 move the sliding ramp 214 back towards the rotating ramp 212 and the spring driver 150 back to the disengaged position. The left and right return springs 136, 146 maintain the left and right brake pedals 130, 140 in the disengaged position.

The stiffness or spring constant of the spring 222 can be the same as, greater than, or less than the stiffness or spring constant of the spring 224. The spring constants of the springs 222, 224 can be selected to provide the desired feedback as at least one of the brake pedals 130, 140 is pressed downward in one of the engaged positions. The springs 222, 224 can have a constant or variable stiffness. The springs 222, 224 can be disc springs.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of one or more functional components, logical components, and various processing steps, which may be comprised of one or more hardware, software, and firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A brake pedal feedback system, comprising:
a spring driver including a first recess and a second recess;
a first spring connected to the spring driver;
a first brake pedal including a first extension at least partially positioned in the first recess; and
a second brake pedal including a second extension at least partially positioned in the second recess;
when the first brake pedal is in a disengaged position and the second brake pedal is in a disengaged position, the first extension is spaced apart from a first surface of the first recess, the second extension is spaced apart from a first surface of the second recess, and the first spring is in a relaxed condition; and
when the first brake pedal is in an engaged position and the second brake pedal is in the disengaged position, the first extension contacts the first surface of the first recess causing the spring driver to move the first spring from the relaxed condition to an energy storing condition.

2. The brake pedal feedback system of claim 1, wherein when the first brake pedal is in the disengaged position and the second brake pedal is in an engaged position, the second extension contacts the first surface of the second recess causing the spring driver to move the first spring from the relaxed condition to the energy storing condition.

3. The brake pedal feedback system of claim 1, wherein when the first brake pedal is in the engaged position and the second brake pedal is in the engaged position, the first extension contacts the first surface of the first recess and the second extension contacts the first surface of the second recess causing the spring driver to move the first spring from the relaxed condition to the energy storing condition.

4. The brake pedal feedback system of claim 1, wherein:
when the first brake pedal is in the engaged position and the second brake pedal is in the disengaged position, the first spring exerts a force to return the first brake pedal to the disengaged position;
when the first brake pedal is in the disengaged position and the second brake pedal is in the engaged position, the first spring exerts a force to return the second brake pedal to the disengaged position; and
when the first and second brake pedals are in the engaged positions, the first spring exerts a force to return the first and second brake pedals to the disengaged positions.

5. The brake pedal feedback system of claim 1, further comprising:
a first return spring biasing the first brake pedal to the disengaged position.

6. The brake pedal feedback system of claim 1, wherein the spring driver connects to a push rod configured to compress the first spring when at least one of the first and second brake pedals are in the engaged position.

7. The brake pedal feedback system of claim 1, further comprising:
a first spring receiver connected to an extension of the spring driver and a first push rod;
a second spring receiver connected to a second push rod, the first spring positioned between the first spring receiver and the second spring receiver; and
a second spring positioned between the second spring receiver and the second push rod, the first push rod compressing at least one of the first and second springs when at least one of the first and second brake pedals are in the engaged position.

8. The brake pedal feedback system of claim 1, wherein the spring driver includes a ball ramp configured to compress the first spring when at least one of the first and second brake pedals are in the engaged position.

9. The brake pedal feedback system of claim 1, further comprising:
a ball ramp including a rotating ramp and a sliding ramp; and
a support disc spaced apart from the sliding ramp, the first spring positioned between the sliding ramp and the support disc, the sliding ramp compressing the first spring when at least one of the first and second brake pedals are in the engaged position.

10. The brake pedal feedback system of claim 1, further comprising:
a ball ramp including a rotating ramp and a sliding; and
a housing spaced apart from the sliding ramp, the first spring positioned between the sliding ramp and the housing, the sliding ramp compressing the first spring when at least one of the first and second brake pedals are in the engaged position.

11. A work vehicle including a brake pedal feedback system, comprising:
a spring driver including a first recess and a second recess;
a first spring connected to the spring driver;
a first brake pedal including a first extension at least partially positioned in the first recess; and
a second brake pedal including a second extension at least partially positioned in the second recess;
when the first brake pedal is in a disengaged position and the second brake pedal is in a disengaged position, the first extension is spaced apart from a first surface of the first recess, the second extension is spaced apart from a first surface of the second recess, and the first spring is in a relaxed condition; and
when the first brake pedal is in an engaged position and the second brake pedal is in the disengaged position, the first extension contacts the first surface of the first recess causing the spring driver to move the first spring from the relaxed condition to an energy storing condition.

12. The work vehicle of claim 11, wherein when the first brake pedal is in the disengaged position and the second brake pedal is in an engaged position, the second extension contacts the first surface of the second recess causing the spring driver to move the first spring from the relaxed condition to the energy storing condition.

13. The work vehicle of claim 11, wherein when the first brake pedal is in the engaged position and the second brake pedal is in the engaged position, the first extension contacts the first surface of the first recess and the second extension contacts the first surface of the second recess causing the spring driver to move the first spring from the relaxed condition to the energy storing condition.

14. The work vehicle of claim 11, wherein:
when the first brake pedal is in the engaged position and the second brake pedal is in the disengaged position, the first spring exerts a force to return the first brake pedal to the disengaged position;
when the first brake pedal is in the disengaged position and the second brake pedal is in the engaged position, the first spring exerts a force to return the second brake pedal to the disengaged position; and
when the first and second brake pedals are in the engaged positions, the first spring exerts a force to return the first and second brake pedals to the disengaged positions.

15. The work vehicle of claim 11, further comprising:
a first return spring biasing the first brake pedal to the disengaged position.

16. The work vehicle of claim 11, wherein the spring driver connects to a push rod configured to compress the first spring when at least one of the first and second brake pedals are in the engaged position.

17. The work vehicle of claim 11, further comprising:
a first spring receiver connected to an extension of the spring driver and a first push rod;
a second spring receiver connected to a second push rod, the first spring positioned between the first spring receiver and the second spring receiver; and
a second spring positioned between the second spring receiver and the second push rod, the first push rod compressing at least one of the first and second springs when at least one of the first and second brake pedals are in the engaged position.

18. The work vehicle of claim 11, wherein the spring driver includes a ball ramp configured to compress the first spring when at least one of the first and second brake pedals are in the engaged position.

19. The work vehicle of claim 11, further comprising:
a ball ramp including a rotating ramp and a sliding ramp; and
a support disc spaced apart from the sliding ramp, the first spring positioned between the sliding ramp and the support disc, the sliding ramp compressing the first spring when at least one of the first and second brake pedals are in the engaged position.

20. The work vehicle of claim 11, further comprising:
a ball ramp including a rotating ramp and a sliding; and
a housing spaced apart from the sliding ramp, the first spring positioned between the sliding ramp and the housing, the sliding ramp compressing the first spring when at least one of the first and second brake pedals are in the engaged position.

* * * * *